United States Patent Office 3,416,126
Patented Dec. 10, 1968

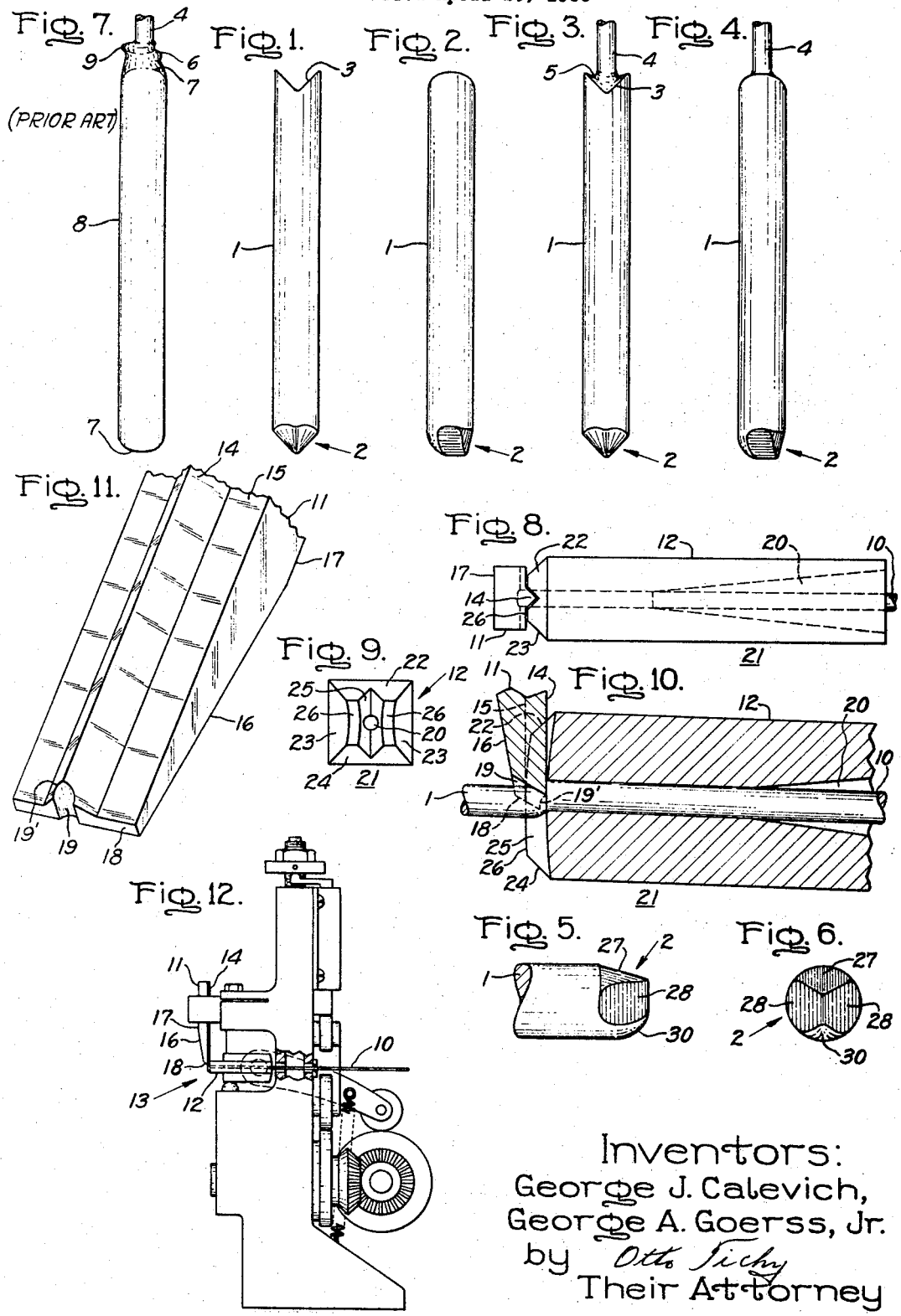

3,416,126
CONTACT PIN AND MANUFACTURE THEREOF
George J. Calevich, Cleveland, and George A. Goerss, Jr., Cleveland Heights, Ohio, assignors to General Electric Company, a corporation of New York
Filed Apr. 18, 1966, Ser. No. 543,294
3 Claims. (Cl. 339—275)

ABSTRACT OF THE DISCLOSURE

An electrical contact pin and a welded leading-in wire including the pin. The pin has a generally tapering surface at one end and a transverse V-shaped notch at the opposite end accommodating the weld knot of the leading-in wire. A wire cutter mechanism for forming the pin is included.

---

The present invention relates to contact pins for electrical devices.

Contact pins used in electronic tubes, electric lamps and the like are provided with rounded or domed-shaped ends to facilitate insertion of the pins into socket contacts. While only the insertion end of the pin need be rounded or dome-shaped for this purpose, it has been the practice to provide both ends of the pins with such contour to avoid problems of orientation of the pins in leading-in wire welding machines. Leading-in wires incorporating contact pins of this type are of butt-welded, sectional construction wherein the pin constitutes the socket contact engaging section and the other section or sections are of different composition so that the leading-in wire will serve its intended purpose in the electric devices in which it is incorporated. Since such devices require precision construction and are made by high speed automatic machines, the leading-in wires are subject to rigid requirements as to straightness, strength of the welds between various sections and the welds must not have thereabout "knots" or "flash" of such size or shape as would interfere with the automatic feeding of the leading-in wires to the lamp or tube-making machine or cause rupturing stresses in the glass-to-metal seals in which the wires are incorporated.

Heretofore in the manufacture of leading-in wires incorporating such pins, the pins have first been cut from length of wire to the size required and then both ends of the pin are given a domed shape by a pin rolling machine. The pins are then cleaned, pickled, plated, annealed and inspected. The pins thus prepared are fed into the welding machine which joins the pins to the other sections of the leading-in wire. Various problems are encountered in this procedure including difficulty of properly feeding the pins, which are of small size and difficult to handle properly; occasionally a weak weld may result from a partially misfed pin and the rolling of the pin to reshape the ends thereof occasionally traps impurities in the ends of the pin which have an adverse effect on the weld. Further, during welding, the molten metal is free to flow laterally and tends to form weld knots of undesirable shape and size.

A well known type of machine for electrically welding leading-in wires is disclosed in the United States Patent No. 2,034,560, Bumstead, patented Mar. 17, 1936. Such machines are capable of severing short lengths from a plurality of metal wires of different composition, presenting the cut lengths in end-to-end relation and welding the lengths together, all at a very high rate of speed. Machines of this type are used for fabricating leading-in wires of sectional construction one end of which extends within the interior of the electric lamp envelope or electronic tube and the opposite end of which is attached to a base provided on such tube or lamp.

None of the leading-in wire sections severed from the wire supplies by such machines are adapted to serve as contact pins because their ends are not rounded or tapered to facilitate insertion thereof into socket contacts. On the contrary, the ends of such sections are square-cut or cut at an oblique angle.

The principal object of the present invention is to provide a cutter adapted to severe contact pin shaped sections from a wire supply.

Another object of the invention is to provide such a cutter mountable on leading-in wire welding machines of the above type without modification of such machines.

A further object of the invention is to provide a cut contact pin which facilitates welding of a leading-in wire section thereto and molds molten metal at the weld.

A still further object of the invention is to provide a welded leading-in wire including a cut contact pin.

Further objects and advantages of the invention will appear from the following description of species thereof, the accompanying drawing and the appended claims.

A feature of the wire cutter of the present invention is a knife and die combination having V-shaped mating surfaces in the form of a V-shaped ridge on the knife and a V-shaped groove in the die. A longitudinally extending wire passage in the die opens at the bottom of the V-shaped groove and a groove circular in cross section extends generally transversely of the ridge on the knife.

The groove in the knife is at an oblique angle to the wire passage in the die and thus to the wire during severing of the latter. Relative movement of the knife and the die engages the groove in the knife with a wire extending through and beyond the die and exerts a combined cutting, shearing and upsetting action on the wire which is effective for severing the wire and providing a V-shaped notch in one of the severed ends and a generally tapered, compound surface on the other end.

Successive cuts of the wire by the knife and die is effective for fabricating contact pins generally tapered at one end for insertion into socket contacts and having a V-shaped notch at the opposite end to facilitate welding of the pins to leading-in wire sections. When the cutter is mounted on a welding machine of the above type, for example, the notched end of each pin serves as a guide for the section of the leading-in wire to be welded thereto, provides a freshly cut, clean welding surface, tends to confine weld splatter and molds the molten metal during welding to shape the weld knot which is accommodated in the notch.

In the drawing accompanying and forming part of this specification:

FIG. 1 is an elevational view of a contact pin embodying the invention;

FIG. 2 is a similar view of the pin shown in FIG. 1 turned ninety degrees on its longitudinal axis;

FIG. 3 is an elevational view of a contact pin of the invention showing the leading-in wire section welded thereto and the weld knot between the contact pin and the leading-in wire section;

FIG. 4 is a similar view of the welded pin and leading-in wire section shown in FIG. 3;

FIG. 5 is a fragmentary, elevational view on an enlarged scale of the insertion end of a contact pin of the type shown in FIGS. 1 to 4;

FIG. 6 is an end on view of the pin shown in FIG. 5;

FIG. 7 is an elevational view of a prior art contact pin rounded at both ends showing also a leading-in wire section welded to one end of the pin and the weld knot between the contact pin and the leading-in wire section;

FIG. 8 is a top plan view of the knife and die of the invention showing also a length of wire to be severed;

FIG. 9 is an end on view of the die shown in FIG. 8;

FIG. 10 is a fragmentary, partly sectional side elevational view on an enlarged scale of the knife and die combination shown in FIG. 8 and showing also in full a length of wire, the knife and die and the parts of the wire being shown in their relative positions on complete severance of the wire;

FIG. 11 is a fragmentary perspective view on an enlarged scale of the knife shown in FIGS. 8 and 10 showing the wire engaging groove in the cutting end of the knife; and FIG. 12 is a side elevational view partly in section of a wire cutting mechanism of the type shown and described in the U.S. patent referred to above and including the knife and die of the present invention.

As shown in FIGS. 1 to 6, the contact pin 1 embodying the invention has a generally tapering, bluntly pointed end 2 for insertion into a socket contact and a V-shaped notch (FIGS. 1 and 3) in its opposite end. The V-shaped notch 3 extends completely across the end of the pin. When the pin is brought into end-to-end relation with the smaller diameter wire 4 shown in FIGS. 3 and 4 for welding, the sides of the V-shaped notch 3 in the pin serve to guide the end of the wire into the notch. The notch 3 also provides space to accommodate the weld knot 5 (FIG. 3) between the wire 4 and the pin 1, molds the molten metal constituting the weld knot and minimizes splatter of molten metal during welding. As shown in FIGS. 3 and 4, the weld knot 5 between the wire 4 and the pin 1 is accommodated within the notch 3 and is of molded shape conforming substantially to that of the space defined by the notch in the end of the pin.

In contrast, as shown in FIG. 7, the weld knot 6 at one of the rounded or dome-shaped ends 7 of the prior art pin 8 shown in this figure allows the intermingled molten metal of the pin and the leading-in wire 4 constituting the weld knot 6 to assume, during welding, a free irregular form determined principally by the surface tension of the molten metal. With such pins rounded at both ends, a portion of the weld knot occasionally projects laterally beyond the pin, as shown at 9 in FIG. 7, to obstruct automatic feeding of leading-in wires in the mass production of electric lamps and electronic devices incorporating such wires. In addition, such weld knots 6 cause strains in glass-to-metal seals including the leading-in wires which tend to rupture the seals. These problems presented by welded contact pins rounded at both ends are of long standing in the art and are minimized by the unique structure of the contact pins 1 of the present invention.

The generally tapering insertion end 2 of each of the pins 1 shown in FIGS. 1 to 6 has a compound surface formed as described below.

The contact pins 1 are severed from a supply of suitable wire 10 by the knife 11 and die 12 shown in FIGS. 8 to 11 mounted on the wire cutting mechanism 13 shown in FIG. 12.

As shown in FIGS. 8 and 10 to 12, the knife 11 is elongated, generally rectangular in cross section and has a V-shaped longitudinally extending ridge 14 along its front face 15. The lower portion 16 of the back face 17 of the knife 11 slopes at an angle of ten degrees toward the bottom surface 18. The bottom surface 18 slopes at an angle of sixty degrees to the front face 15 of the knife and has therein a groove 19 circular in cross section and of the same slope centered with respect to the ridge 14, as best shown in FIGS. 10 and 11. The cutting edge 19' of the knife is at the intersection of the groove 19 and the sides of the ridge 14.

The die 12 shown in FIGS. 8 to 10 is elongated and is square in cross section and has a longitudinally extending bore 20 having an inwardly tapering portion at its back end and a cylindrical portion at its forward end. The forward end surface 21 of the die 12 has beveled edges 22, 23, 24 and 25 (FIG. 9), is slightly rounded between two parallel edges 22 and 24, has a slightly curved V-shaped groove 25 extending along the rounded surface 26 with the bottom of the groove extending across the longitudinal axis of the bore 20 of the die.

The sides of both the V-shaped ridge 14 on the knife 11 and the sides of the V-shaped groove 25 in the die 12 are at an angle of ninety degrees to each other. The ridge and the groove are of such relative height and depth respectively that with the front face 15 of the knife in engagement with the rounded surface 26 of the die, as shown in FIGS. 8 and 10, the cutting edge 19' of the knife engages and cuts the wire extending through and beyond the bore of the V-shaped die immediately at the forward end of the bore as the die is moved relative to the knife, as described below. The coaction of the knife and the die produces the V-shaped notch 3 in the end of the wire 10 remaining in the die 12 and the generally tapered compound surface at one end of the severed section of the wire constituting pin 1. Successive cuts in the wire 10 are effective for producing contact pins 1 notched at one end and tapered at the other.

The knife 11 and the die 12 are mounted in the wire cutter mechanism 13 of the type shown and described in the above patent to which reference is made for a description of the mechanism. As shown in FIG. 12, the die 12 is supported in the mechanism 13 for pivotal movement around a horizontal axis and the knife 11 is supported in a stationary vertical position. In the operation of the machine the wire 10 to be severed is fed step-by-step into the mechanism either manually or automatically. With the wire at dwell and with a suitable length of wire extending beyond the forward end of the die the latter is pivoted from a horizontal position in which the wire 10 is slightly below the lower end of the knife 11 into the position shown in FIG. 10 in which the cutting edge 19' and the walls of groove 19 engage the wire as shown.

In the relative position of the die 12 and the knife 11 shown in FIG. 10 the wire 10 is completely severed. After severing of the wire the die is returned to a horizontal position by the mechanism shown. The wire 10 then is moved through the die a sufficient distance to provide a length of wire beyond the forward face of the die to constitute a contact pin and the operation is repeated as described above.

While the cutter mechanism 13 described above may be used to provide contact pins of the type known as "straights" in the art, these being elongated pins which are sealed directly into glass-to-metal seals and which are sold as a separate article of commerce, it will be understood that it is contemplated that the knife and die embodying the present invention may be mounted on the machine for electrically welding wires disclosed in the Bumstead patent referred to above without modification of the machine to make leading-in wires including the cut contact pins.

The tapered insertion end 2 of the contact pin 1 has a compound surface formed by the coaction of the knife 11 and the die 12 on the wire 10. As the forward end 21 of the die is moved progressively upward in an arcuate path into the position shown in FIG. 10, the wire 10 is forced first against the cutting edge 19' of the knife and then against the sides of the groove 19 in the knife. Of course, the wire 10 is also forced against the bottom portion of the bore 20 in the die. The action continues until the wire is severed. As a result of this action the end of the wire remaining in the die has a V-shaped notch 3 therein and the proximate end of the section severed from the wire is shaped so as to be suitable as the insertion end 2 of a contact pin.

Referring to FIGS. 5 and 6 and also FIGS. 1 through 4 of the drawing, the tapered end 2 of the pin 1 is pyramidal in shape on the three sides 27, 28 and 29 and slightly rounded on the fourth side 30. The compound surface of the pin end 2 is of generally rounded or tapered contour and is suitable to facilitate insertion of the pin 1 into engagement with socket contacts.

The surfaces 27, 28 and 29 of the pin end 2 are shaped by the slanted groove 19 in the knife and the rounded surface 30 of the pin end is formed by the pressure of the knife and the die on the wire offsetting the wire slightly during severing, as shown in FIG. 10, to upset the underside of the wire and round off that side to form surface 30.

In a specific embodiment of the invention for severing nickel wires of 0.040 inch in diameter, the forward end of the bore 20 of the die 12 was 0.041 inch in diameter and the radius of curvature of the groove 19 in the knife 11 was 0.022 inch. The depth of the V-shaped groove 25 in the die was 0.032 inch and the height of the V-shaped ridge 14 on the knife was 0.032 inch. The radius of the curved forward surface 26 of the die was 0.907 inch and that of the bottom of the groove 25 in the die 0.875 inch on the same reference point. The groove 19 in the knife was at an angle of sixty degrees to the front face 15.

While a specific embodiment of the invention has been shown and described above to comply with the Statutes, it will be understood, of course, that changes in the form and details of the apparatus shown and described may be made without departure from the spirit and scope of the invention, for example, the relative movement between the knife and the die may be a straight line movement of either or both to bring the knife into cutting engagement with the wire to be severed into sections having the form of the contact pins 1.

What we claim as new and desire to secure by Letters Patent of the United States is:

1. An electrical contact pin for insertion into engagement with a socket contact, said pin terminating in a blunt, generally tapering compound surface at its insertion end and having a transverse cut notch in its opposite end, said compound surface including three generally pyramidal portions and an upset generally rounded portion.

2. An electrical contact pin according to claim 1 wherein the depth of the cut notch corresponds approximately to the length of the generally tapering compound surface.

3. A welded leading-in wire comprising a contact pin for insertion into engagement with a socket contact and a smaller diameter wire welded end-to-end to said pin, the welded end of the pin having a transverse cut notch therein accommodating the weld knot between said pin and said wire, said pin terminating in a blunt, generally tapering compound surface at its insertion end, said compound surface including three generally pyramidal portions and an upset generally rounded portion.

References Cited

UNITED STATES PATENTS

| | | | |
|---|---|---|---|
| 1,685,382 | 9/1928 | Stuart | 219—151 |
| 1,738,709 | 12/1929 | Jones | 339—275 X |
| 1,856,681 | 5/1932 | Wolcott | 339—275 X |
| 2,156,319 | 5/1939 | Steele | 339—213 X |
| 2,292,236 | 8/1942 | Martin | 339—97 |
| 2,422,380 | 6/1947 | Whitaker | 339—275 X |
| 2,434,123 | 1/1948 | Ridgers et al. | 339—275 X |

MARVIN A. CHAMPION, *Primary Examiner.*

P. TEITELBAUM, *Assistant Examiner.*

U.S. Cl. X.R.

339—108, 278; 83—580